United States Patent Office 3,548,356
Patented Dec. 15, 1970

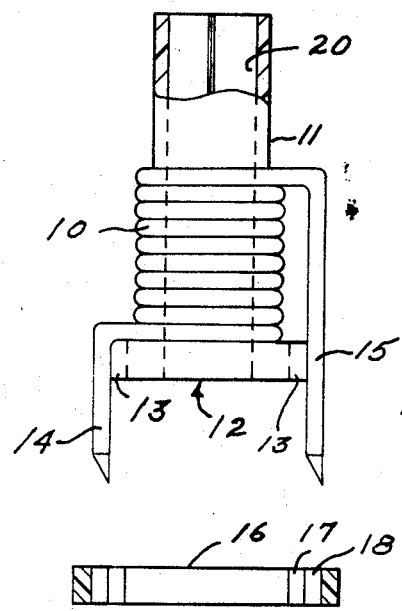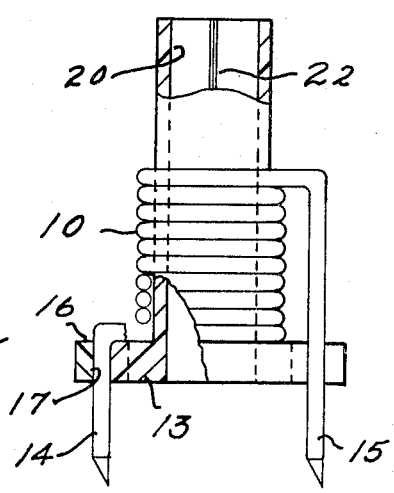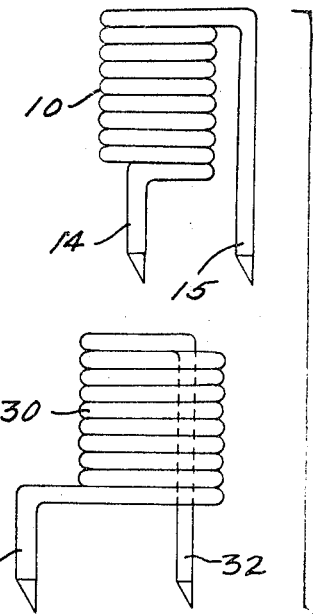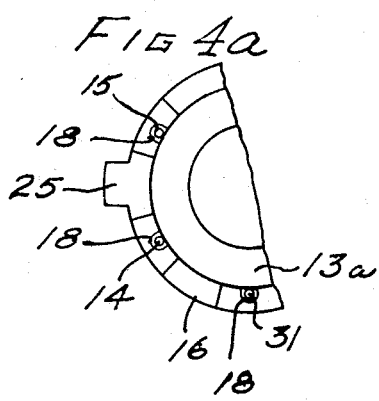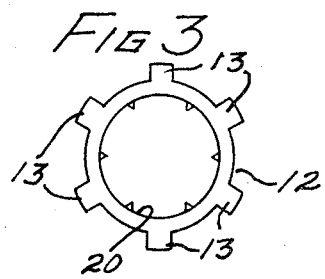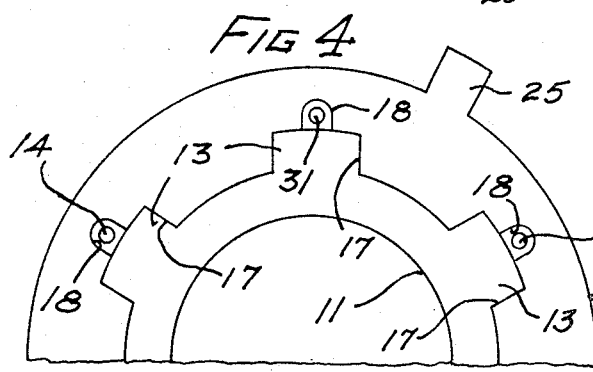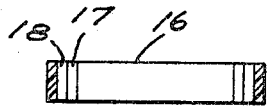

3,548,356
ELECTRICAL WINDING CONSTRUCTION
Thomas J. Wright, Itasca, Ill., assignor to Bel-Tronics Corporation, Addison, Ill., a corporation of Illinois
Filed June 5, 1969, Ser. No. 830,786
Int. Cl. H01f 15/10
U.S. Cl. 336—192                                7 Claims

ABSTRACT OF THE DISCLOSURE

An electrical coil and transformer construction including a coil form member having radial extending ribs or an integral flange over which the ends of the windings extend. An annular wire retaining ring receives the ribs or is press fitted to the integral flange and provides restricted passageways for the wire ends to impart longitudinal stability thereto.

---

The present invention relates to an electrical coil and transformer structure and more particularly to an improved electrical coil and transformer structure which is constructed so as to render the component susceptible of automatic assembly into circuit sub-assemblies such as printed circuits and the like.

It is a principal object of the present invention to provide an electrical coil component of the foregoing type which is of simple and rugged structure and at the same time economical to manufacture.

It is a further object to provide an electrical component of the foregoing type wherein the ends of the wire of the coil or coils form the mounting and are supported in a manner so that wire or coil ends serve to provide the mounting support for the circuit element.

Other objects and features will hereinafter appear.

In the drawings:

FIG. 1 is an exploded view of the components of a coil construction embodying the structure of the present invention, and with some of the parts being broken away to show underlying details of structure;

FIG. 2 is a longitudinal view of the fully assembled coil of FIG. 1, and with some of the parts being broken away to show underlying details of structures;

FIG. 2a is a longitudinal view of a flanged version of coil form;

FIG. 3 is a bottom plan view of the ribbed version of coil form of the coil assembly;

FIG. 4 is an enlarged fragmentary bottom plan view of the ribbed version assembly shown in FIG. 2; and FIG. 4a is an enlarged fragmentary bottom plan view of the flange version assembly shown in FIG. 2a;

FIG. 5 is an exploded view of a modified coil construction.

The present invention relates to the construction of coils, transformers, chokes, and the like, for use in electronic circuit assemblies, as for example, in the video amplifier of a television set. The invention features the integral formation of the turns of the electrical coil with the mounting leads or prongs, and for this purpose, employs relatively heavy, stiff wire. The assembly is of rugged construction and adaptable to receive an adjustably positioned magnetic core. Various forms will be shown and described.

In FIGS. 1, 2, 3, and 4 of the drawings, my invention is shown embodied in a coil assembly in which a coil 10 is developed on or received upon and concentrically supported by a tubular coil form portion or stem 11 of a plastic body member 12. The body member 12 includes at one end thereof a plurality of angularly spaced ribs 13 or flange 13a. The ribs 13, and/or flange 13a are each integral with and extend radially outward from the stem 17 and serve as an axially locating support for the adjacent end of the coil 10. The winding 10 is developed from relatively heavy and stiff insulated magnet wire, which is suitable to form the winding means 10.

The wire from which the winding 10 is formed is preferably sufficiently rigid so that the projecting ends 14–15 of the coil 10 may serve as the mounting pins for the finished structure. Thus, no soldering or other connection to separate mounting pins is necessary to integrate the circuit component into its ultimate chassis. For convenience in mounting, the leads 14–15 may be nail-pointed by employing conventional means. The leads 14–15 may project for different axial lengths, thereby providing unambiguous terminal identification.

As shown in FIGS. 1 and 4, in accordance with the present invention there is provided a lead wire retaining collar 16 to provide alignment support for the wires 14 and 15.

The collar 16 is formed with a plurality of angularly spaced recesses 17 equal in number to the ribs 13 which are snugly accommodated and seated therein or fitted to press on to outside diameter of flanged version. At the inner wall of each of the recesses 17 there is formed a general U-shaped notch 18 which accommodates the diameter of the wires 14 and 15 therein.

At least four such ribs 13, recesses 16 and notches 17 are provided so that the body member 12 may be used as the form on which two concentrically supported transformer windings are received and so that there is at least one U-shaped notch 17 for each of the leads for the various transformer windings. Such a transformer will be more fully discussed in connection with FIG. 5.

To assemble the body member 12, coil 10, and collar 14, the coil 10 is initially positioned on the stem 11, with the leads 14 and 15 extending over the outer periphery of the two of the respective ribs 13 or flange 13a. The subassembly of the coil body 11 and coil 10 is then inserted in the collar 16.

The coil 10 may then be plastic bonded as by means of an epoxy resin so that the turns of the winding 10 are bonded to each other and intimately to the member 12 along the stem 11 and ribs 13. At the same time the epoxy may be used to permanently fix the collar 16 to the stem 11. For clarity the bonding has not been illustrated in the drawings.

It is to be observed, as clearly shown in FIG. 5, that the lead 15 is embraced or confined within the walls of the U-shaped notch 17 and the outer edge of the rib 13 or outer edge of flange 13a. In this manner the lead 15 and lead 14 similarly confined in an angularly spaced notch 17 are retained in a substantially vertical position by the collar 16.

For unambiguous ultimate circuit orientation, the retaining collar 16 may be provided with a lobe 25 or other key means. The lobe 25 permits the use of automatic handling machinery to sense orientation and establish proper angular reference to the chassis to which the circuit components may be assembled.

In order to provide for adjustment of the electrical inductance of the coil 10, the bore of the stem or coil form 11 may be ribbed or otherwise formed to readily accommodate the threads of a ferrite or the like core member 21, keyed at 22 for adjustment. It will be appreciated that by positively locating the coil 10 by seating the same against the ribs 13 or flange 13a, maximum axial clearance is provided between the inner end of coil 10 and the reduced end of the coil form 11. In this manner a substantial length of the coil form within which core member 21 may be accommodated with minimum interaction with coil 10, so that a maximum range of inductance adjustment is available.

As indicated generally above, the body member 12 is adapted to receive transformer windings, namely, a winding in addition to the winding 10 described in connection with FIGS. 1 and 4. Such a transformer configuration is suggested in FIG. 5 wherein the parts are shown in exploded relation. Corresponding parts have been given the same reference numerals, and the winding 10 has been shown as the inner winding of the transformer. The only difference between the winding 10 shown in FIG. 5 and the winding 10 shown in FIG. 1 is that the lead 15 for one end thereof is formed with a slightly greater radial offset, or at least the lead 15 must be formed with such offset as to permit reception of the turns of the other winding 30 radially between the lead wire 15 and the body of the winding 10. The winding 30 is preferably also formed of the same insulated relatively stiff wire as the winding 10, and with leads 31–32 projection integrally beyond one axial and at locations spaced angularly from each other and from the angular location of the leads 14–15, as for example to be received in the remaining available lead-locating U-shaped notches 18 in the wire retaining collar 16.

It will be understood that, upon assembly, coil 10 will be concentrically supported on the coil form or stem 11 and that coil 30 may be concentrically supported by coil 10 or both may be supported in spaced end to end position by coil form or stem 11. Depending upon the relative axial length of the two windings 10–30, one or both may be axially located against the ribs 13, and preferably a plastic bonding compound, such as an epoxy resin, is employed to intimately secure the turns of both windings to each other in concentrically located relation and to the coil form and to the adjacent face of the ribs 13.

In the embodiment of FIG. 5 as in the embodiment of FIGS. 1–4 the projecting lead ends 14–15 and 31–32 are of such length compared with the weight and size of the completed assembly that they provide the substantial mounting support for the entire structure, and no additional parts or soldering connections are necessary to complete the assembly.

I claim:
1. An electrical coil assembly comprising an elongated tubular coil form member having an integral annular flange formed at one end thereof, an electrical winding including turns of relatively heavy rigid wire disposed about said coil form portion and having straight ends projecting downwardly over and axially beyond said flange, and an annular wire retaining collar snugly receiving said flange and having a plurality of angularly spaced U-shaped notches formed in the inner wall to provide restricted passages through which said straight ends of said wire extend.

2. The invention as defined in claim 1 wherein said flange comprises a plurality of angularly spaced ribs, and said collar includes a plurality of recesses providing seats for said ribs.

3. The invention as defined in claim 2 wherein said ribs and said recesses are shaped complementary to each other, and each include a wall concentric to said tubular coil, and wherein said U-shaped notch is formed in said concentric wall of said recesses.

4. The invention as defined in claim 1 wherein said electrical winding is a coil having two straight ends.

5. The invention as defined in claim 1 wherein said electrical winding is a transformer having two concentric coils having four straight ends.

6. The invention as defined in claim 1 wherein said electrical winding is a transformer having two coils placed in end-to-end relationship and having four straight ends.

7. The invention as defined in claim 2 wherein said coil form includes at least four ribs.

References Cited

UNITED STATES PATENTS 3,024,443   3/1962   Goldsmith _____ 336—192X

ELLIOT GOLDBERG, Primary Examiner

U.S. Cl. X.R.

336—198